(No Model.)
J. BATTERSBY.
BICYCLE RETAINER AND LOCK.
No. 602,279. Patented Apr. 12, 1898.
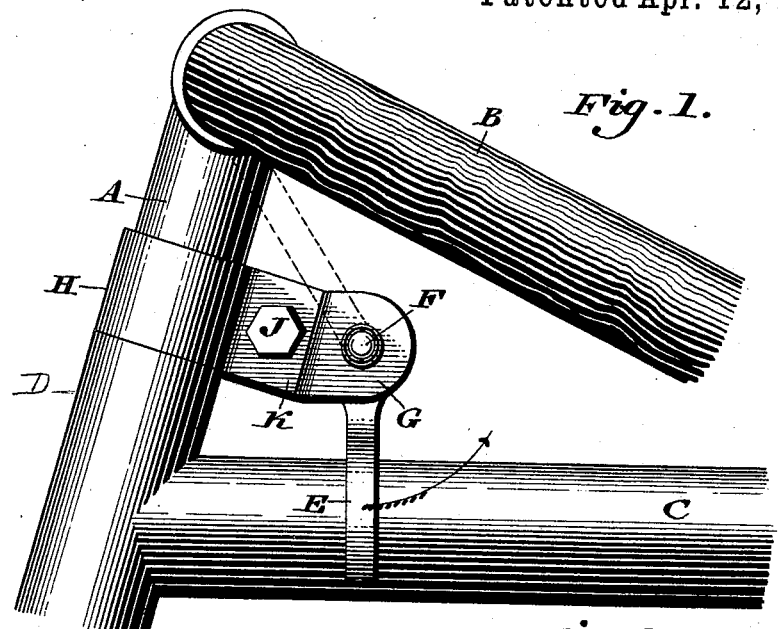
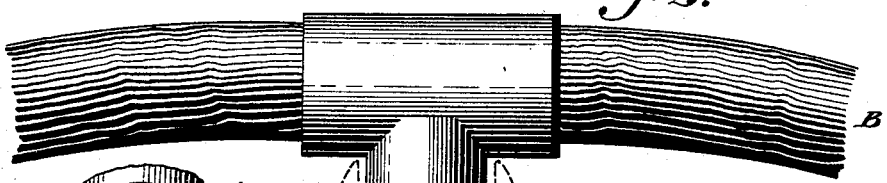
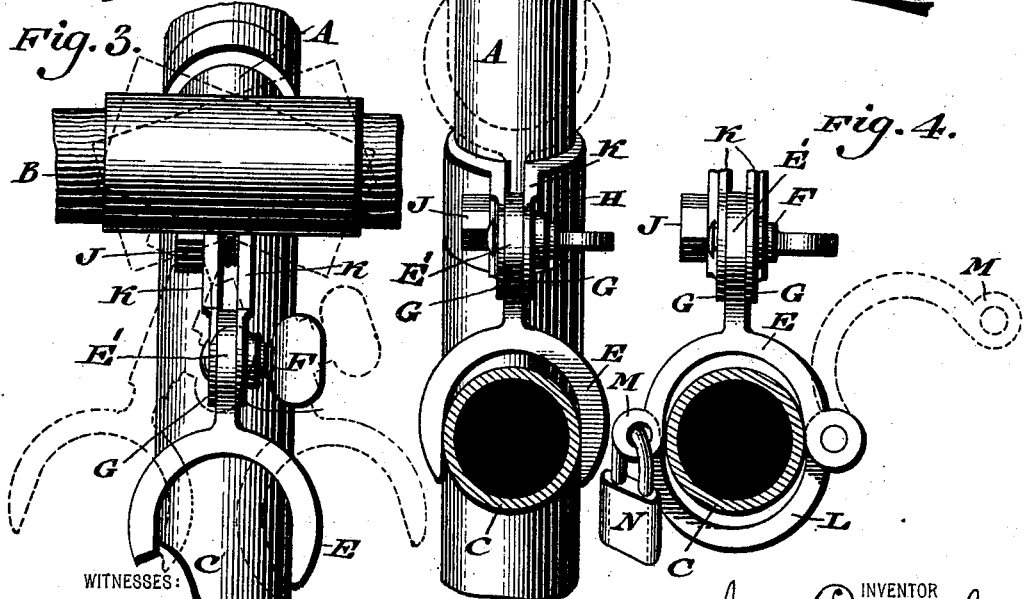

UNITED STATES PATENT OFFICE.

JAMES BATTERSBY, OF PHILADELPHIA, PENNSYLVANIA.

BICYCLE RETAINER AND LOCK.

SPECIFICATION forming part of Letters Patent No. 602,279, dated April 12, 1898.

Application filed November 20, 1896. Serial No. 612,828. (No model.)

*To all whom it may concern:*

Be it known that I, JAMES BATTERSBY, a subject of the Queen of Great Britain, residing in the city and county of Philadelphia, State of Pennsylvania, have invented a new and useful Improvement in Bicycle Retainers and Locks, which improvement is fully set forth in the following specification and accompanying drawings.

My invention consists of a bicycle-lock composed of the parts combined and arranged as hereinafter set forth and claimed.

Figure 1 represents a side elevation of a bicycle-retainer embodying my invention. Fig. 2 represents a partial rear elevation and partial vertical section thereof. Fig. 3 represents a top or plan view thereof. Fig. 4 represents a partial rear elevation and partial vertical section of a bicycle-lock embodying my invention.

Similar letters of reference indicate corresponding parts in the several figures.

Referring to the drawings, A designates the rod of the steering-wheel of a bicycle, and B the handle-bars thereof.

C designates the reach or portion of the frame of the bicycle, and D the sleeve of the rod A, to which said reach is secured.

E designates a rising-and-falling shackle which extends from the eye E', the latter being mounted on the screw F, which is fitted in the ears G of the clip H, the latter tightly embracing the rod A and being held firmly thereon by the screw J, which passes through the necks K or portions of the clip adjacent to the ears G, the same being adapted to be brought together by the action of the screw J, thus closing the clip on the rod and causing it to move therewith, it being noticed that the ears G are integral extensions of said necks K, said ears and necks having their own tightening-screws F and J, respectively.

It will be seen that the shackle is of the shape of an arch or inverted U and located over the reach C in such manner that when it is lowered it will embrace said reach. In this position the screw F is tightened, whereby the ears G are tightened against the eye E', so that the shackle is held immovable on the reach C. This locks the rod A and prevents the same from being turned, the effect of the same being communicated to the fork and steering-wheel, so that lateral turning of said wheel is prevented, or in cases when a bicycle is placed or rested against a wall, fence, &c., it will not slip or fall, as occurs where the rod A is uncontrolled. It will also be seen that the ears G are rearward continuations of the necks K, which also constitute ears, so that the two screws F and J are on the same side—that is, rearward of the clip H—it being noticed that there are no ears or projections on the clip in front of said clip. Moreover, the ears G are thinner than the ears K, so that they are more elastic than said ears K, and thus when the clip is adjusted on the rod of the steering-fork and tightly closed by the screw J the necks K are practically rigid, and thus the screw F may be turned to open or close the ears G without disturbing the adjustment of said ears G, and consequently of the clip.

When service of the shackle is not required, the screw F is loosened and the shackle thrown up, as shown dotted in Fig. 1, after which the screw is again tightened, thus controlling the shackle.

When it is desired to prevent the movement of the shackle while on the reach, I employ the supplementary shackle L, which is hinged to the shackle E and adapted to encircle the reach C, as in Fig. 4, each shackle having an eye M for the reception of the bow of the padlock N, the effect of which is evident.

It will be noticed that the necks K are normally some distance apart and there is an intervening free space between them, so that the proper action of the screw J will tend to bring them closely together, thereby binding the clip H in place, and also tending to some extent to increase the pressure of the ears G toward the eye of the shackle.

Having thus described my invention, what I claim as new, and desire to secure by Letters Patent, is—

The combination with a rising-and-falling shackle having an eye thereon, of a clip, necks rearward of the ends of said clip, ears rearward of said necks, a screw in said necks, and a screw in said eye and ears, said necks being practically rigid, and said ears being practically elastic and said clip, necks and ears being integral continuities of each other.

JAMES BATTERSBY.

Witnesses:
  JOHN A. WIEDERSHEIM,
  WM. C. WIEDERSHEIM.